(12) United States Patent
Hurrell

(10) Patent No.: US 8,702,139 B1
(45) Date of Patent: Apr. 22, 2014

(54) GAME ENGAGING DEVICE

(71) Applicant: Vance A. Hurrell, Port Royal, PA (US)

(72) Inventor: Vance A. Hurrell, Port Royal, PA (US)

( * ) Notice: Subject to any disclaimer, the term of this patent is extended or adjusted under 35 U.S.C. 154(b) by 0 days.

(21) Appl. No.: 13/672,087

(22) Filed: Nov. 8, 2012

(51) Int. Cl.
   *B65G 7/12* (2006.01)

(52) U.S. Cl.
   USPC .............................. 294/26; 294/169

(58) Field of Classification Search
   USPC ............... 294/26, 219, 25, 19.3, 175, 191, 294/137–172
   See application file for complete search history.

(56) References Cited

U.S. PATENT DOCUMENTS

| 486,879 | A | | 11/1892 | Lovett | |
|---|---|---|---|---|---|
| 580,949 | A | * | 4/1897 | Murphy | 294/26 |
| 782,302 | A | * | 2/1905 | Williams | 294/26 |
| 895,126 | A | * | 8/1908 | Thomson | 294/26 |
| 1,640,102 | A | * | 8/1927 | Valliere | 294/26 |
| 1,753,566 | A | * | 4/1930 | Gannon et al. | 294/26 |
| 1,890,509 | A | * | 12/1932 | Hopkins | 294/26 |
| 2,436,990 | A | * | 3/1948 | Darling | 294/26 |
| 4,351,126 | A | * | 9/1982 | Simonson | 43/5 |
| 5,029,921 | A | | 7/1991 | Houghton et al. | |
| 5,316,356 | A | | 5/1994 | Nutting | |
| 5,382,064 | A | | 1/1995 | Blais | |
| 5,425,562 | A | * | 6/1995 | Baldwin | 294/26 |
| 6,142,547 | A | | 11/2000 | Bowerman | |
| 6,247,739 | B1 | * | 6/2001 | Lyon | 294/159 |
| 6,457,763 | B2 | | 10/2002 | Cornelius | |
| 6,805,246 | B1 | * | 10/2004 | Manabat | 211/13.1 |
| 6,921,325 | B1 | | 7/2005 | Mace | |
| 7,896,416 | B2 | | 3/2011 | Carter | |
| 8,182,008 | B2 | * | 5/2012 | Meckwood | 294/137 |
| 2005/0088002 | A1 | * | 4/2005 | Dwyer | 294/26 |

* cited by examiner

*Primary Examiner* — Saul Rodriguez
*Assistant Examiner* — Gabriela Puig

(57) ABSTRACT

A game engaging device securely engages game to facilitate dragging the game from one location to a desired second location. The device includes a shaft having a first end and a second end. A handle is rotatably coupled to the first end of the shaft and a hook is coupled to and extends from the second end of the shaft.

8 Claims, 4 Drawing Sheets

GAME ENGAGING DEVICE

BACKGROUND OF THE DISCLOSURE

Field of the Disclosure

The disclosure relates to hunting devices and more particularly pertains to a new hunting device for securely engaging game to facilitate dragging the game from one location to a desired second location.

SUMMARY OF THE DISCLOSURE

An embodiment of the disclosure meets the needs presented above by generally comprising a shaft having a first end and a second end. A handle is rotatably coupled to the first end of the shaft and a hook is coupled to and extends from the second end of the shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
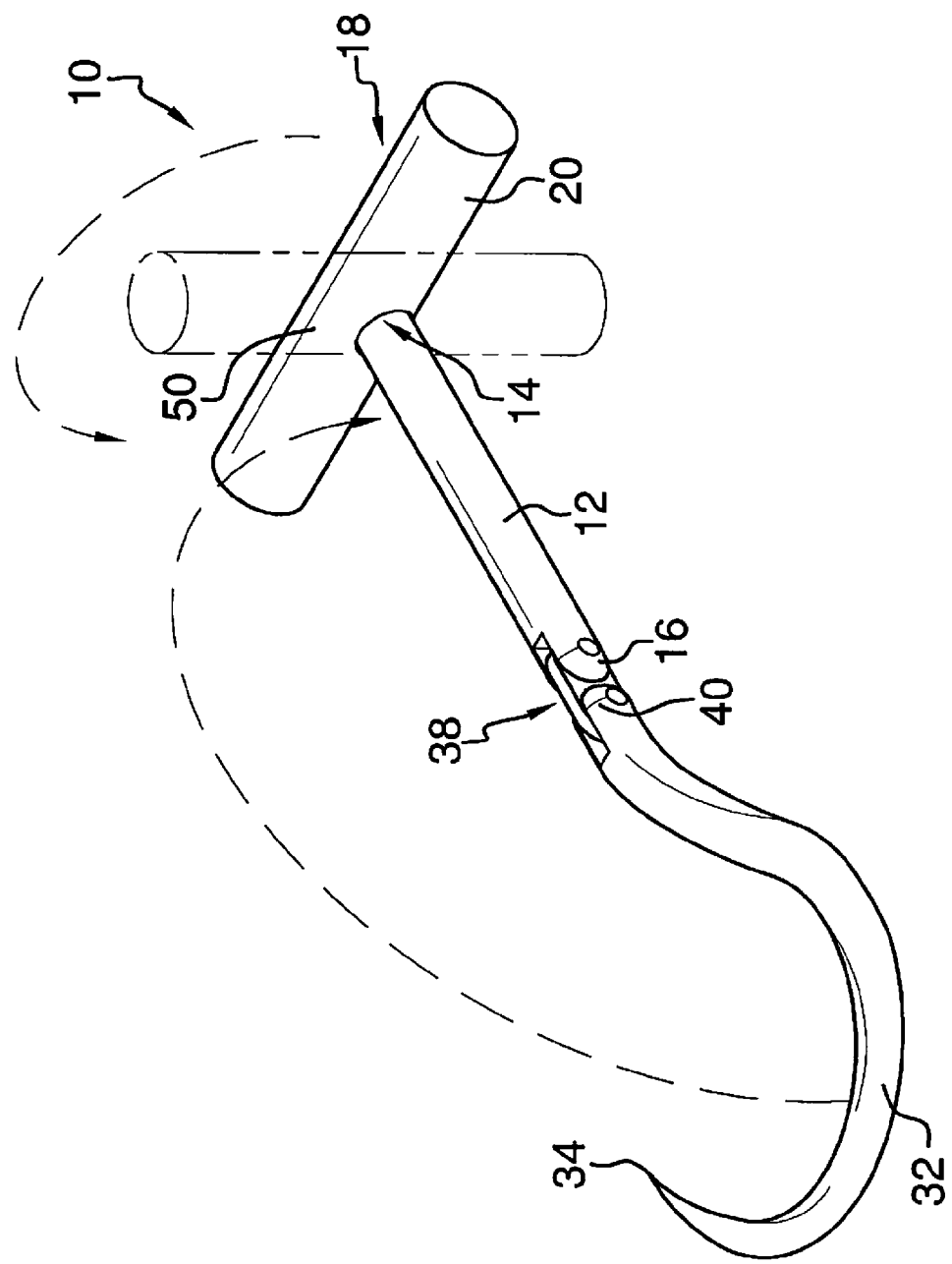
FIG. 1 is a bottom front side perspective view of a game engaging device according to an embodiment of the disclosure.
Figure 2:
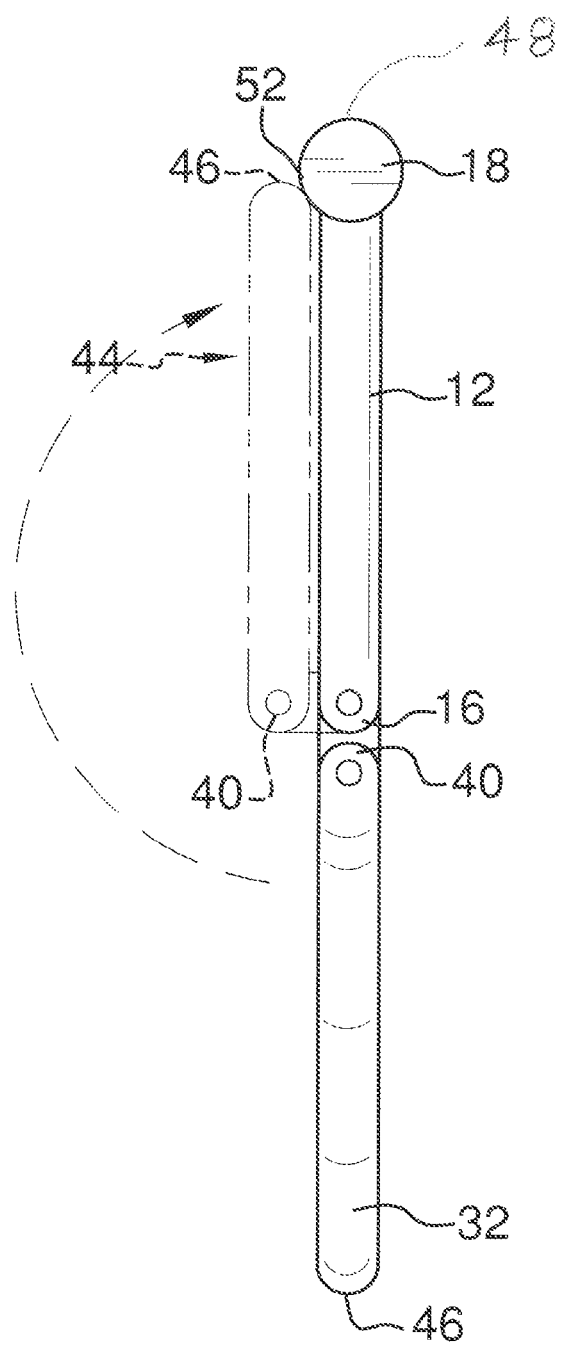
FIG. 2 is a back view of an embodiment of the disclosure.
Figure 3:
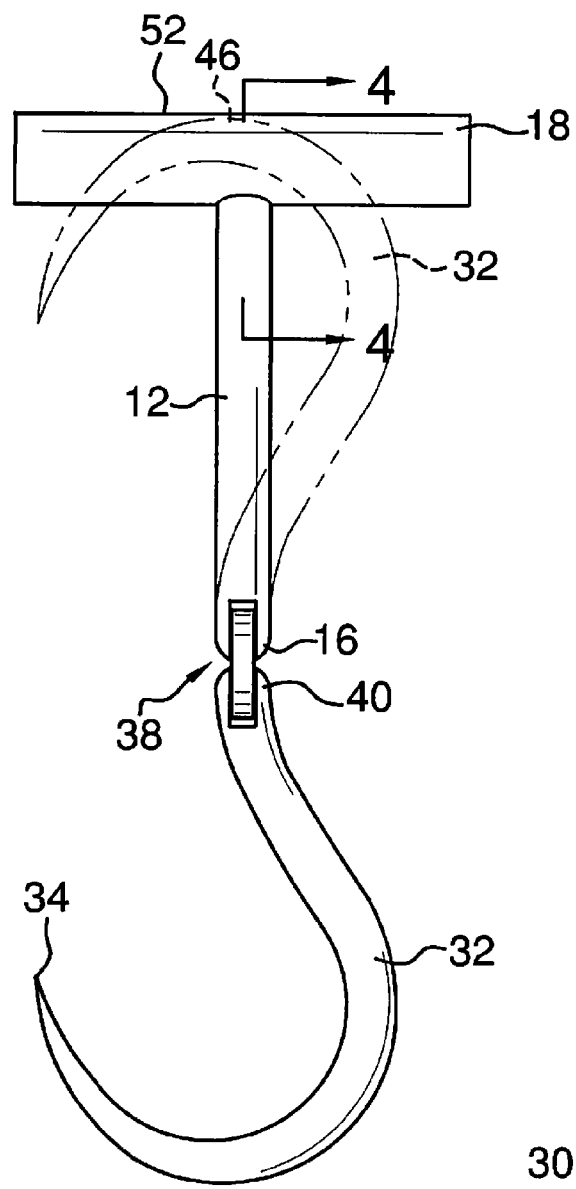
FIG. 3 is a side view of an embodiment of the disclosure.
Figure 4:
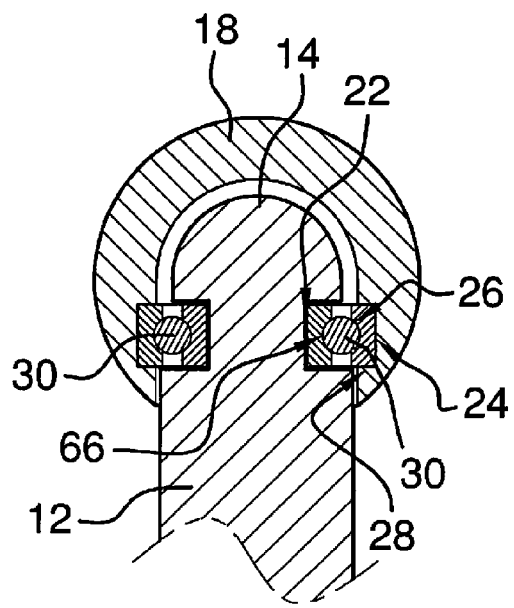
FIG. 4 is a cross-sectional view of an embodiment of the disclosure taken along line 4-4 of FIG. 3.
Figure 5:
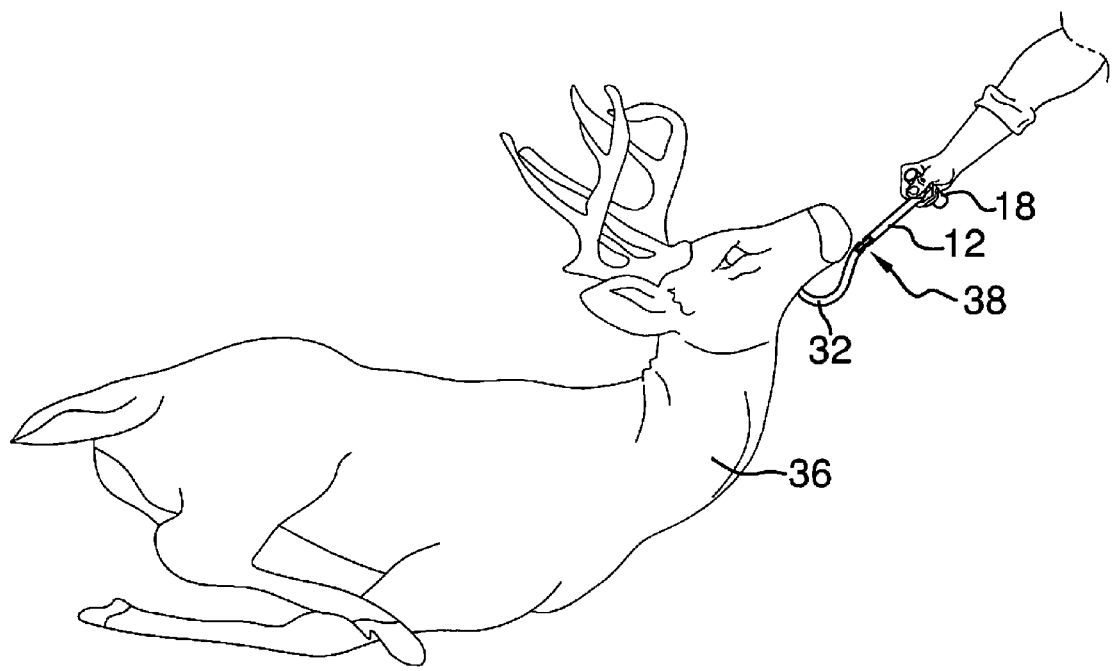
FIG. 5 is a side view of an embodiment of the disclosure in use.

With reference now to the drawings, and in particular to FIGS. 1 through 5 thereof, a new hunting device embodying the principles and concepts of an embodiment of the disclosure and generally designated by the reference numeral 10 will be described.

As best illustrated in FIGS. 1 through 5, the game engaging device 10 generally comprises a shaft 12 having a first end 14 and a second end 16. A handle 18, which may comprise an elongated bar 20, is rotatably coupled to the first end 14 of the shaft 12. A radial channel 22 extends into the shaft 12 adjacent to the first end 14 of the shaft 12. A radial cavity 24 extends into the handle 18. A groove 26 is positioned in the cavity 24 and extends around an interior surface 28 of the cavity 24. The groove 26 is aligned with the channel 22 when the first end 14 of the shaft 12 is inserted into the cavity 24 in the handle 18. A complementary second groove 66 may be positioned in the channel 22 aligning with the groove 26. A plurality of ball bearings 30 is positioned between and extends into the channel 22 and the groove 26 wherein the handle 18 is rotatably coupled to the first end 14 of the shaft 12.

A hook 32 is coupled to and extends from the second end 16 of the shaft 12. A distal end 34 of the hook 32 relative to the shaft 12 is pointed to facilitate insertion of the distal end 34 of the hook 32 into game 36. A double hinge 38 may be employed to couple a proximal end 40 of the hook 32 relative to the shaft 12 to the second end 16 of the shaft 12. Thus, the shaft 12 and the hook 32 are foldable into a collapsed position 44 wherein the hook 32 and the shaft 12 are positioned in parallel planes. A length from the proximal end 40 straight across the hook 32 to a distal edge 46 of the hook 32 relative to the second end 16 of the shaft 12 may be substantially equal to a length from the second end 16 of the shaft 12 to a distal edge 48 of the handle 18 relative to the second end 16 of the shaft 12. Thus, the distal edge 46 of the hook 32 and the distal edge 48 of the handle 18 are substantially coplanar when the shaft 12 and the hook 32 are in the collapsed position 44.

A middle 50 of the handle 18 is coupled to the first end 14 of the shaft 12. A radius of the handle 18 extending away from the first end 14 of the shaft 12 may be substantially equal to a distance measured transversely from a longitudinal axis of the shaft 12 to the distal end 34 of the hook 32 relative to the second end 16 of the shaft 12. Thus, the distal end 34 of the hook 32 is substantially aligned with an outer edge 52 of the handle 18 when the handle 18 is oriented parallel to the hook 32 such as in the collapsed position 44. Thus, the footprint of the device 10 is minimized when in the collapsed position 44.

In use, the handle 18 is grasped and the distal end 34 of the hook 32 is inserted into the game 36 to provide secure connection of the handle 18 to the game 36. The handle 18 rotates freely around the first end of the shaft 12 to permit comfortably positioning a hand grasping the handle 18 while the game 36 is dragged to a desired location. The hook 32 is easily disengaged from the game 36 when desired and the shaft 12 and hook 32 may be folded into the collapsed position 44 and stored until needed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A game engaging device comprising:

a shaft having a first end and a second end;

a handle, said handle being rotatably coupled to said first end of said shaft;

a hook hingedly coupled to and extending from said second end of said shaft, said hook being collapsible relative to said shaft;

said shaft being linear from said first end to said second;

said hook being arcuate, said hook having a medial portion positioned between a first portion coupled to said second end and a second portion including a free end of said hook; and wherein a line extending along said shaft and through said first and second ends extends through said medial portion when said hook is fully deployed relative to said shaft and lies in a same plane as said shaft, wherein the line is oriented perpendicular to a longitudinal axis of said handle further comprising a double hinge coupling said hook to said shaft.

2. The device of claim 1, further comprising a distal end of said hook relative to said shaft being pointed.

3. The device of claim 1, further comprising a length of said hook from said proximal end to a distal edge of said hook being substantially equal to a length from said second end of said shaft to a distal edge of said handle relative to said second end of said shaft wherein said distal edge of said hook and said distal edge of said handle are substantially coplanar when said shaft and said hook are in said collapsed position.

4. The device of claim 1, further comprising said handle being an elongated bar.

5. The device of claim 4, further comprising a middle of said handle being coupled to said first end of said shaft.

6. The device of claim 5, further comprising a radius of said handle extending from said first end of said handle being substantially equal to a distance measured transversely from a longitudinal axis of said shaft to said distal end of said hook relative to said second end of said shaft.

7. The device of claim 1, further comprising:
a channel extending into said shaft adjacent to said first end of said shaft;
a cavity extending into said handle;
a groove positioned in said cavity and extending around an interior surface of said cavity, said groove being aligned with said channel when said first end of said shaft is inserted into said cavity in said handle; and
a plurality of ball bearings positioned between and extending into said channel and said groove wherein said handle is rotatably coupled to said first end of said shaft.

8. A game engaging device comprising:
a shaft having a first end and a second end;
a handle, said handle being an elongated bar, said handle being rotatably coupled to said first end of said shaft;
a hook coupled to and extending from said second end of said shaft, a distal end of said hook relative to said shaft being pointed;
a double hinge coupling a proximal end of said hook relative to said shaft to said second end of said shaft wherein said shaft and said hook are foldable into a collapsed position;
a length of said hook from said proximal end to a distal edge of said hook being substantially equal to a length from said second end of said shaft to a distal edge of said handle relative to said second end of said shaft wherein said distal edge of said hook and said distal edge of said handle are substantially coplanar when said shaft and said hook are in said collapsed position;
a middle of said handle being coupled to said first end of said shaft;
a radius of said handle extending from said first end of said handle being substantially equal to a distance measured transversely from a longitudinal axis of said shaft to said distal end of said hook relative to said second end of said shaft;
a channel extending into said shaft adjacent to said first end of said shaft;
a cavity extending into said handle;
a groove positioned in said cavity and extending around an interior surface of said cavity, said groove being aligned with said channel when said first end of said shaft is inserted into said cavity in said handle; and
a plurality of ball bearings positioned between and extending into said channel and said groove wherein said handle is rotatably coupled to said first end of said shaft;
said hook having a medial portion positioned between a first portion coupled to said second end and a second portion including a free end of said hook; and
wherein a line extending along said shaft and through said first and second ends extends through said medial portion when said hook is fully deployed relative to said shaft and lies in a same plane as said shaft.

* * * * *